(12) United States Patent
Yang et al.

(10) Patent No.: US 8,915,637 B2
(45) Date of Patent: Dec. 23, 2014

(54) LIGHT SOURCE MODULE

(71) Applicants: Chiao-Chih Yang, Hsin-Chu (TW);
Chao-Chun Cheng, Hsin-Chu (TW);
Hsin-Hung Lee, Hsin-Chu (TW);
Wei-Ching Wu, Hsin-Chu (TW);
Yen-Hao Chen, Hsin-Chu (TW)

(72) Inventors: Chiao-Chih Yang, Hsin-Chu (TW);
Chao-Chun Cheng, Hsin-Chu (TW);
Hsin-Hung Lee, Hsin-Chu (TW);
Wei-Ching Wu, Hsin-Chu (TW);
Yen-Hao Chen, Hsin-Chu (TW)

(73) Assignee: Young Lighting Technology Inc., Hsin-Chu (TW)

( * ) Notice: Subject to any disclaimer, the term of this patent is extended or adjusted under 35 U.S.C. 154(b) by 0 days.

(21) Appl. No.: 13/848,031

(22) Filed: Mar. 20, 2013

(65) Prior Publication Data

US 2013/0286685 A1    Oct. 31, 2013

(30) Foreign Application Priority Data

Mar. 21, 2012  (TW) .............................. 101109708 A

(51) Int. Cl.
*F21V 7/04* (2006.01)
*F21V 8/00* (2006.01)

(52) U.S. Cl.
CPC .................................... *G02B 6/0011* (2013.01)
USPC ............................ 362/612; 362/615; 362/97.1

(58) Field of Classification Search
CPC .................................................... G02B 6/0011
USPC ................ 362/613, 623, 624, 625, 626, 97.1, 362/97.2, 97.3, 609, 612, 235, 241, 245
See application file for complete search history.

(56) References Cited

U.S. PATENT DOCUMENTS

| | | | |
|---|---|---|---|
| 6,598,998 B2 | 7/2003 | West et al. | |
| 7,905,617 B2 * | 3/2011 | Yun et al. | 362/97.1 |
| 7,980,747 B2 * | 7/2011 | Vissenberg et al. | 362/612 |
| 8,066,419 B2 * | 11/2011 | Vissenberg et al. | 362/612 |
| 8,083,390 B2 | 12/2011 | Ijzerman et al. | |
| 8,605,232 B2 * | 12/2013 | Qi et al. | 349/62 |
| 2007/0247871 A1 * | 10/2007 | Yoo | 362/612 |

(Continued)

FOREIGN PATENT DOCUMENTS

| | | |
|---|---|---|
| CN | 1393729 | 1/2003 |
| CN | 102345818 | 2/2012 |

(Continued)

OTHER PUBLICATIONS

"Office Action of Taiwan Counterpart Application", issued on Oct. 13, 2014, p. 1-6.

*Primary Examiner* — Nimeshkumar Patel
*Assistant Examiner* — Glenn Zimmerman
(74) *Attorney, Agent, or Firm* — Jianq Chyun IP Office

(57) ABSTRACT

A light source module including a light guide plate, a plurality of light emitting devices, and a plurality of first reflective devices is provided. The light guide plate has a plurality of through holes and a light emitting surface. The through holes pass through the light emitting surface. Each of the through holes has a first side wall and a second side wall opposite the first side wall. At least one of the light emitting devices is disposed in each of the through holes. Each of the light emitting devices is capable emitting a light beam. The light beam enters the light guide plate from the first side wall of the through hole which the light emitting device is disposed in and leaves the light guide plate from the light emitting surface. The first reflective devices are disposed on the second side walls of the through holes.

13 Claims, 13 Drawing Sheets

(56) References Cited

U.S. PATENT DOCUMENTS

| | | | |
|---|---|---|---|
| 2009/0066877 A1* | 3/2009 | Abe et al. | 349/62 |
| 2009/0296026 A1* | 12/2009 | Bae et al. | 349/65 |
| 2009/0303410 A1 | 12/2009 | Murata et al. | |
| 2010/0091488 A1* | 4/2010 | Ijzerman et al. | 362/235 |
| 2010/0109576 A1* | 5/2010 | Ijzerman et al. | 315/312 |
| 2010/0252846 A1* | 10/2010 | Bierhuizen et al. | 257/98 |
| 2011/0050556 A1* | 3/2011 | Bae et al. | 345/102 |
| 2011/0149594 A1* | 6/2011 | Terajima et al. | 362/606 |
| 2011/0242794 A1 | 10/2011 | Nakamura et al. | |
| 2013/0135895 A1* | 5/2013 | Ohshima | 362/607 |

FOREIGN PATENT DOCUMENTS

| | | |
|---|---|---|
| JP | 2010507189 | 3/2010 |
| TW | 200913221 | 3/2009 |
| TW | M368093 | 11/2009 |
| TW | 201124662 | 7/2011 |
| TW | I358004 | 2/2012 |

* cited by examiner

LIGHT SOURCE MODULE

CROSS-REFERENCE TO RELATED APPLICATION

This application claims the priority benefit of Taiwan application serial no. 101109708, filed Mar. 21, 2012. The entirety of the above-mentioned patent application is hereby incorporated by reference herein and made a part of this specification.

BACKGROUND OF THE INVENTION

1. Field of the Invention

The invention generally relates to a light source module, and more particularly, to a light source module including a light guide plate.

2. Description of Related Art

A conventional side-type light source module includes a light guide plate, a plurality of light emitting devices disposed in one side of the light guide plate, a reflector disposed under the light guide plate, and an optical film disposed above the light guide plate. A light beam emitted by the light emitting devices enters the light guide plate from a side wall of the light guide plate. Then, the light beam leaves the light guide plate from a light emitting surface by optical micro structures disposed on the light emitting surface. However, in the prior art, the heat generated by the light emitting devices is easily gathered in one side of the light guide plate so that wrinkles are formed on the optical film. Thereby, the optical performance of the conventional side-type light source module is influenced.

A conventional direct-type light source module includes a plurality of optical films, a plurality of light emitting devices disposed under the optical films, and a reflector disposed under the light emitting devices. In the prior art, there must be an enough light-mixing distance between the light emitting devices and the optical film to remain the uniformity of the conventional direct-type light source module. However, the design of the light-mixing distance causes the thickness of the conventional direct-type light source module to hardly be reduced.

Taiwan Patent No. 1358004 discloses a backlight module including a light guide plate and at least one light source optically coupled with the light guide plate. China Patent No. 01122554 discloses a light guide plate having two ends and being slice-shaped. Taiwan Patent No. M368093 discloses a side-type backlight module including a plurality of light guide plates, a plurality of light emitting source, a plurality of light shielding plate, a diffuser, a brightness-enhanced film, and a reflector. U.S. Patent Application Publication No. 20110242794 discloses an illumining device having a plurality of light guide plates disposed in a shell. U.S. Patent Application Publication No. 20090303410 discloses a light guide plate in which a plurality of fillisters are formed. U.S. Pat. No. 8,083,390 discloses an illumining device having a light guide plate. U.S. Pat. No. 6,598,998 discloses another kind of illumining device.

SUMMARY OF THE INVENTION

Accordingly, the invention is directed to a light source module realizing a thin design and having a good optical performance.

Other objectives, features and advantages of the invention will be further understood from the further technological features disclosed by the embodiments of the invention.

To achieve one of, a part of or all of the above-mentioned objectives, or to achieve other objectives, an embodiment of the invention provides a light source module. The light source module includes a light guide plate, a plurality of light emitting devices, and a plurality of first reflective devices. The light guide plate has a plurality of through holes and a light emitting surface. The through holes pass through the light emitting surface. Each of the through holes has a first side wall and a second side wall opposite the first side wall. At least one of the light emitting devices is disposed in each of the through holes. Each of the light emitting devices is capable emitting a light beam. The light beam enters the light guide plate from the first side wall of the through hole which the light emitting device is disposed in and leaves the light guide plate from the light emitting surface. The first reflective devices are disposed on the second side walls of the through holes.

According to an embodiment of the invention, the first side wall and the light emitting surface are substantially perpendicular.

According to an embodiment of the invention, the second side wall and the first side wall are substantially parallel.

According to an embodiment of the invention, there is an obtuse included angle between the second side wall and the light emitting surface.

According to an embodiment of the invention, there is an acute included angle between the second side wall and the light emitting surface.

According to an embodiment of the invention, each of the through holes has at least one penetrating part and at least one concaving part connected to the penetrating part. The light guide plate further has a first surface opposite the light emitting surface. The penetrating part penetrates the light emitting surface and the first surface. The concaving part penetrates the first surface and extends toward the light emitting surface. One of the light emitting devices is disposed in the penetrating part.

According to an embodiment of the invention, the through holes are aligned along a second direction and a first direction. The second direction and the first direction are cross.

According to an embodiment of the invention, the through holes are arranged in n columns. n is a natural number and larger than 2. The n columns of the through holes are arranged along a second direction. Orthogonal projections of the through holes arranged in the odd columns on a reference plane and orthogonal projections of the through holes arranged in the even columns on the reference plane are alternately arranged along a first direction. The reference plane and the light emitting surface are substantially perpendicular. The second direction and the first direction are cross.

According to an embodiment of the invention, each of the through holes is stripe-shaped. At least two of the light emitting devices are disposed in each of the through holes.

According to an embodiment of the invention, the first reflective device has two first reflective surfaces opposite to each other. One of the first reflective surfaces connects with the second side wall. The other of the first reflective surfaces faces to the first side wall.

According to an embodiment of the invention, the light source module further includes a second reflective device. The light guide plate further has a first surface opposite the light emitting surface. The first surface is disposed between the second reflective device and the light emitting surface.

According to an embodiment of the invention, each of the through holes further has a third side wall. The third side wall is connected to the first side wall and the second side wall. The light source module further includes at least one second reflective device disposed on the third side wall.

According to an embodiment of the invention, each of the through holes further has a fourth side wall opposite to the third side wall. The first side wall is connected to the second side wall by the fourth side wall. The light source module further comprises at least one third reflective device disposed on the fourth side wall.

According to an embodiment of the invention, each of the through holes further has a third side wall and a fourth side wall opposite to the third side wall. The third side wall is connected to the first side wall and the second side wall. The fourth side wall is connected to the first side wall and the second side wall. The light source module further includes a plurality of optical micro structures disposed on the third side wall and the fourth side wall.

Based on the description above, in a light source module of one embodiment of the invention, a plurality of light emitting devices are disposed in a plurality of through holes of the light guide plate. At least one of the light emitting devices is disposed in each of the through holes so that the heat generated by the light emitting devices is hardly gathered in one side of the light guide plate. Thereby, the problem about wrinkles being formed on optical films of a conventional side-type light source module due to the heat gathering in one side of the light guide plate may be solved.

Moreover, in a light source module of one embodiment of the invention, the light beam emitting by a plurality of light emitting devices may be transmitted into the light guide plate uniformly by the first side walls of the through holes due to a plurality of light emitting devices being disposed in the through holes of the light guide plate and at least one of the light emitting device being disposed in each of the through holes. Thereby, in the light source module of one embodiment of the invention, it needs not have a long light-mixing distance between the light emitting devices and the light emitting surface of the light guide plate and it is easy to realize a light source module with a thin design.

In order to make the aforementioned and other features and advantages of the invention comprehensible, several exemplary embodiments accompanied with figures are described in detail below.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the present invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

The First Embodiment

Figure 1:
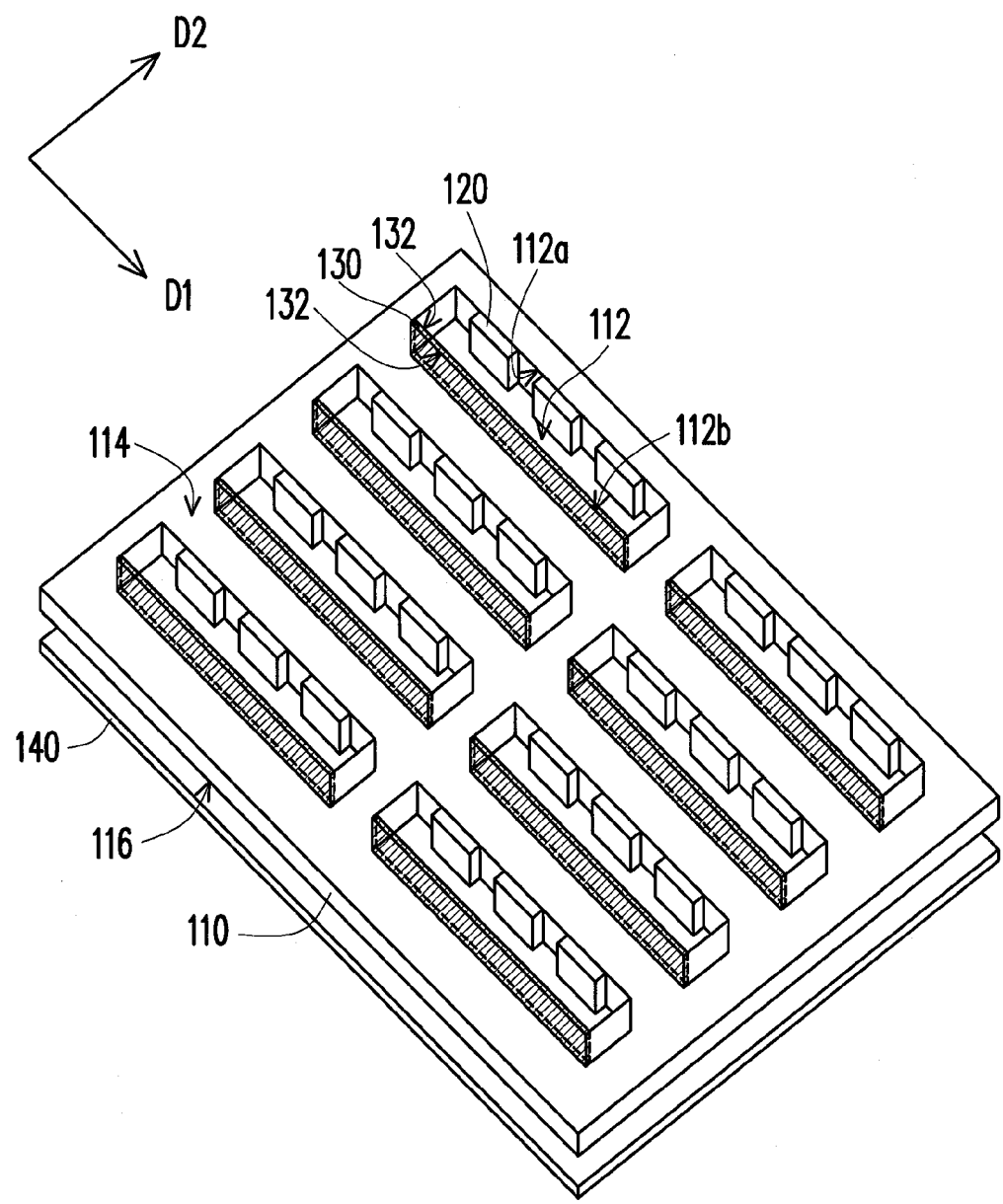
FIG. 1 is a diagram of a light source module according to the first embodiment of the invention.
Figure 2:
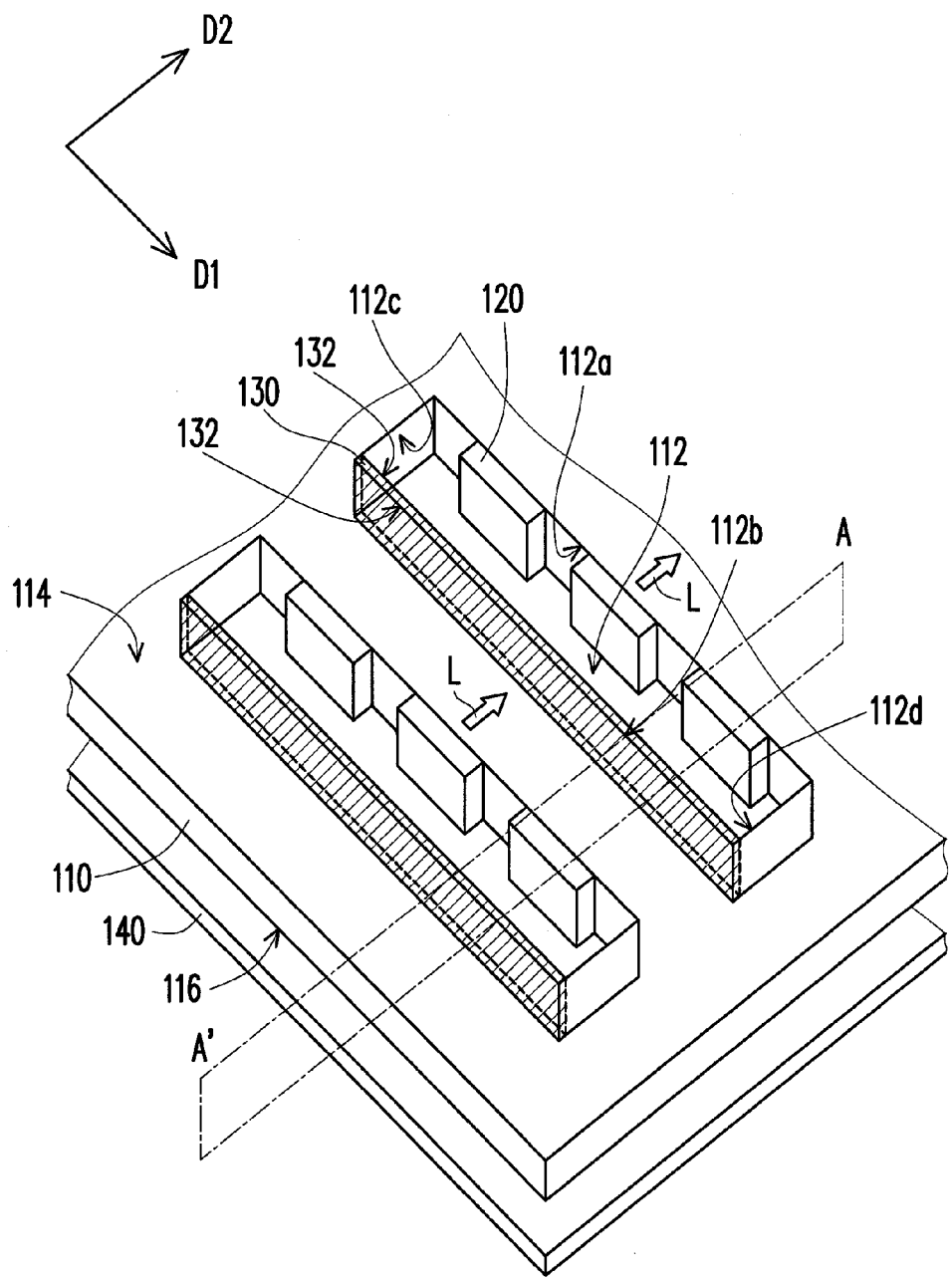
FIG. 2 illustrates the light source module shown in FIG. 1 in partial section view.
Figure 3:
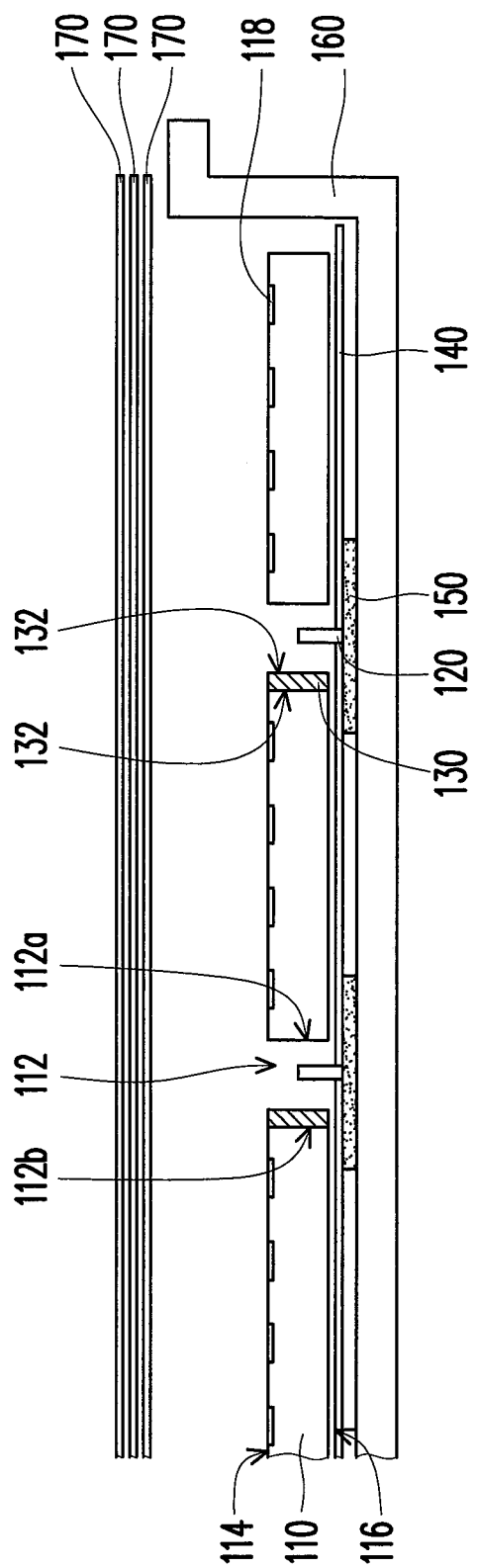
FIG. 3 illustrates a cross section corresponding the surface AA' shown in FIG. 2.

FIG. 1 is a diagram of a light source module according to the first embodiment of the invention. FIG. 2 illustrates a light source module shown in FIG. 1 in partial sectional view. FIG. 3 illustrates a cross section corresponding the surface AA' shown in FIG. 2. It should be noted that FIG. 1 and FIG. 2 neglect a back plate, a driving circuit board electrically connected to light emitting devices, optical films, and optical micro structure for representing obviously. The back plate, the driving circuit board are electrically connected to light emitting devices, and optical films and optical micro structure are illustrated in FIG. 3. Moreover, the normal vector of the surface AA' and a first direction D1 are parallel. Referring to FIG. 1, FIG. 2, and FIG. 3, the light source module 100 of the embodiment includes a light guide plate 110, a plurality of light emitting devices 120, and a plurality of first reflective devices 130. In the embodiment, the light emitting devices 120 may be light emitting diodes. The types of the light emitting diodes include a top-view type and a side-view type. However, the invention is not limited thereto, in other embodiments, the light emitting devices 120 may be cold cathode fluorescent lamps or other types of light sources.

Figure 4:
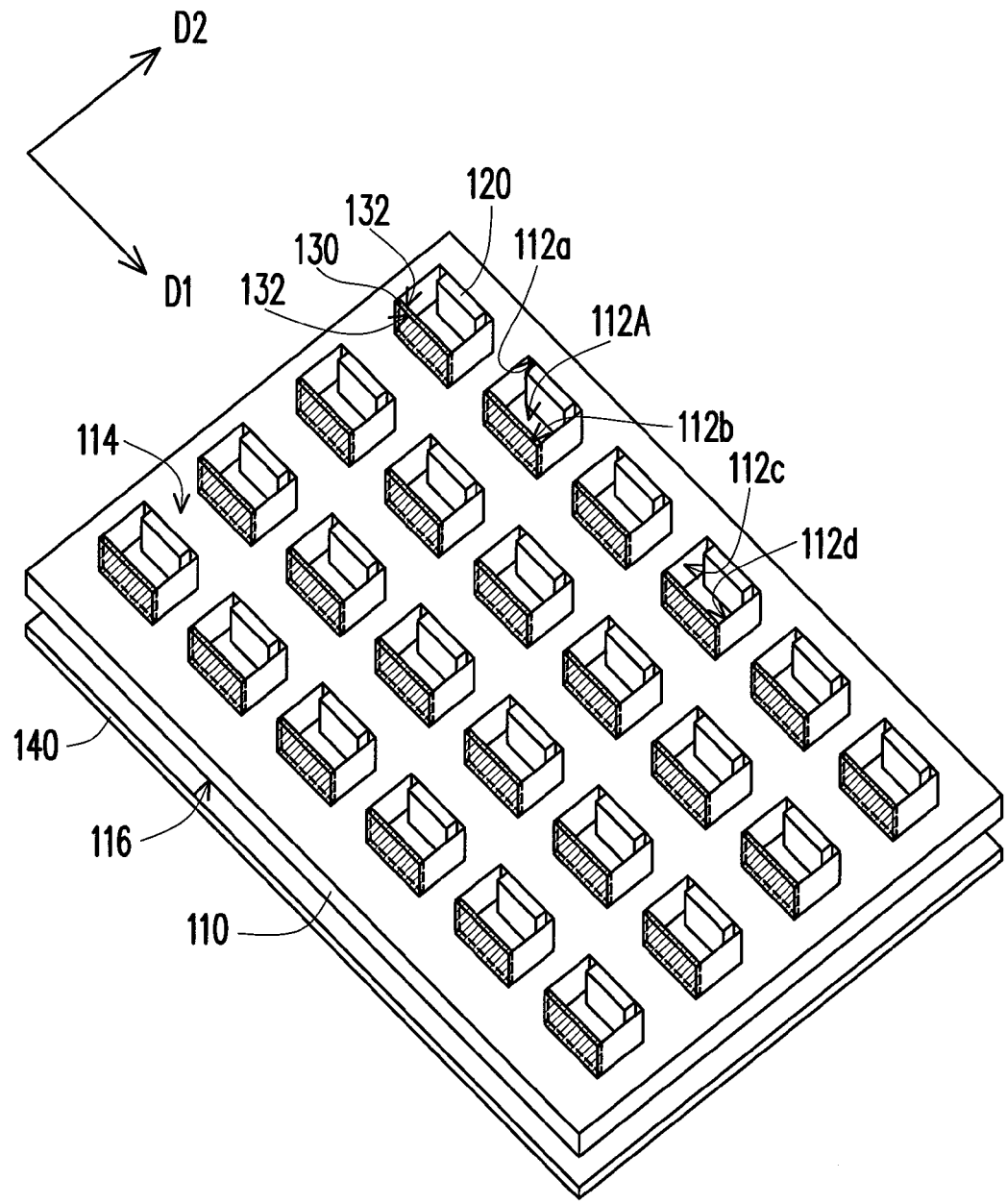
FIG. 4 is a diagram of a light source module according to another embodiment of the invention.

The light guide plate 110 of the embodiment has a plurality of through holes 112 and a light emitting surface 114. The through holes 112 pass through the light emitting surface 114. In detail, the light guide plate 110 further has a first surface 116 opposite the light emitting surface 114, and the through holes 112 pass through the light emitting surface 114 and the first surface 116. As shown in FIG. 1 and FIG. 2, in the embodiment, the through holes 112 may be stripe-shaped openings, and at least two light emitting devices are disposed in each of the through holes 112. However, the invention is not limited thereto, the shape of the through hole 112 and the number of the light emitting device 120 in each of the through holes may be designed according the real demand. That will be illustrated by FIG. 4 in following paragraphs. FIG. 4 is a diagram of the light source module according to another embodiment of the invention. Referring to FIG. 4, the light source module shown in FIG. 4 and the light source module 100 of the embodiment are similar, so the same devices are denoted by the same symbols. In this embodiment, the outline of the through hole 112A cutting by the light emitting surface 114 may be similar to a square, and at least one of the light emitting devices 120 may be disposed in each of the through holes 112A.

Figure 5:
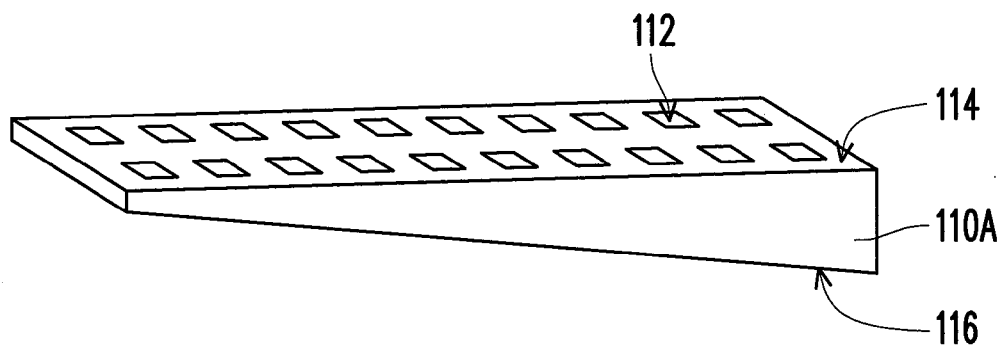
FIG. 5 illustrates a light guide plate of a light source module according to another embodiment of the invention.

Moreover, it should be mentioned that the light emitting surface 114 of the light guide plate 110 and first surface 116 may be parallel in the embodiment. In other words, the shape of the light guide plate 110 of the embodiment may be a transparent rectangular solid substrate having a plurality of through holes 112. However, the invention is not limited thereto. FIG. 5 illustrates a light guide plate of a light source module according to another embodiment of the invention. Referring to FIG. 5, the light emitting surface 114 of the light guide plate 110A and first surface 116 may not be parallel. In other words, the shape of the light guide plate 110A shown in FIG. 5 may be a transparent wedge substrate having a plurality of through holes 112.

Figure 6:
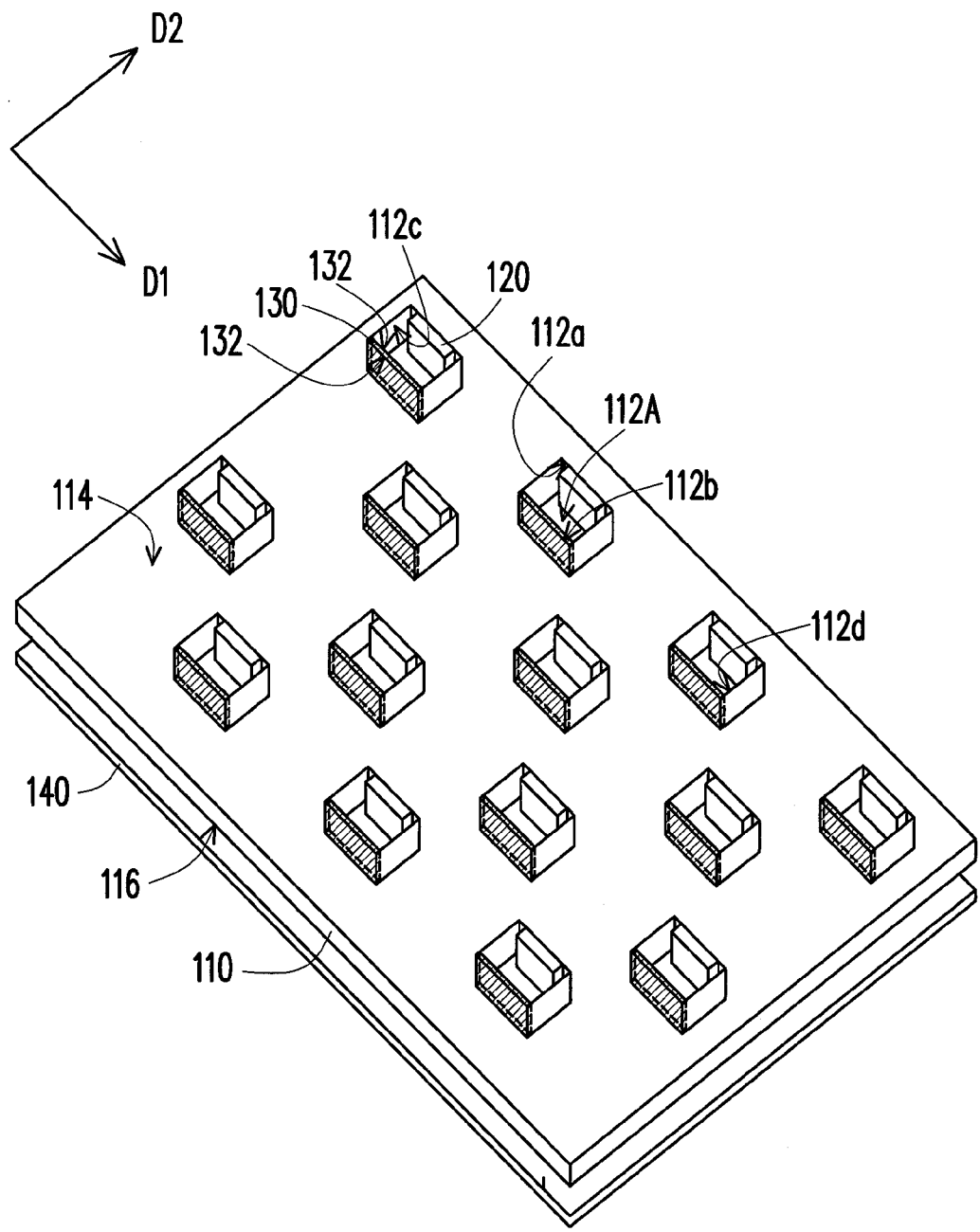
FIG. 6 illustrates a light guide plate of a light source module according to another embodiment of the invention.

Referring to FIG. 1 again, in the embodiment, a plurality of through holes 112 may be arranged in a matrix. Further, the through holes 112 may be aligned along a first direction D1 and a second direction D2, wherein the first direction D1 and the second direction D2 may be cross. In the embodiment, the first direction D1 may be a column direction, the second direction D2 may be a row direction, and the second direction D2 and the first direction D1 may be substantially perpendicular. However, the arrangement of the through hole of the invention is not limited to the above statement. The arrangement of the through hole may be modified according the real demand. That will be illustrated by FIG. 6 in following paragraphs. FIG. 6 illustrates a light guide plate of a light source module according to another embodiment of the invention. Referring to FIG. 6, the light source module shown in FIG. 6 and the light source module 100 of the embodiment are similar, so the same devices are denoted by the same symbols. In this embodiment, the through holes 112A may be arranged in n columns, wherein n is a natural number and larger than 2. The n columns of the through holes 112A may be arranged along a second direction D2. Orthogonal projections of the through holes 112A arranged in the odd columns on a reference plane (such as a plane which is perpendicular to the light emitting surface 114) and orthogonal projections of the through holes 112A arranged in even columns on the reference plane may be alternately arranged along a first direction D1.

Referring to FIG. 1, FIG. 2 and FIG. 3 again, each of the through holes 112 has a first side wall 112a and a second side wall 112b disposed opposite the first side wall 112a. A plurality of light emitting devices 120 are disposed in the through holes 112. At least one of the light emitting devices 120 is disposed in each of the through holes 112. As shown in FIG. 3, each of the light emitting devices 120 is able to emit a light beam L. The light beam L enters the light guide plate 110 from the first side wall 112a of the through hole 112 which the light emitting device 112 is disposed in and leaves the light guide plate 110 from the light emitting surface 114. In the embodiment, the first side wall 112a and the light emitting surface 114 may be substantially perpendicular, and the second side wall 112b and the first side wall 112a may be substantially parallel. However, the invention is not limited thereto.

In the embodiment, a plurality of light emitting devices 120 are disposed in a plurality of through holes 112 of the light guide plate 110, and at least one of the light emitting devices 120 is disposed in each of the through holes 112, so that the heat generated by the light emitting device 120 of the embodiment is hardly gathered in one side of the light guide plate 110. Thereby, the problem about wrinkles being formed on the optical film of a conventional side-type light source module due to the heat gathering in the one side of the light guide plate may be solved. Moreover, in the embodiment, the light guide plate 110 may be divided into a plurality of illuming regions by the through holes 112, and the light emitting device(s) 120 in each of the through holes 112 may be driven independently. In other words, the brightness of each of the illuming regions may be controlled independently so that the purpose of local dimming may be realized by the light source module 100. A display device with the light source module 100 of the embodiment as a backlight may optimize the contrast ratio and reduce the power consumption by controlling the brightness of the light emitting device(s) 120 in each of the through holes 112.

Moreover, in the light source module 100 of the embodiment, because a plurality of light emitting devices 120 are disposed in the through holes 112 of the light guide plate 110 and at least one of the light emitting device 120 is disposed in each of the through holes 112, the light beam L emitting by a plurality of light emitting devices 120 may be transmitted into the light guide plate 110 uniformly by the first side walls 112a of the through holes 112 Thereby, in the light source module 100 of the embodiment, it needs not have a long light-mixing distance between the light emitting devices and the light emitting surface of the light guide plate so that the light source module 100 of the embodiment may be easily thinned.

Referring to FIG. 1, FIG. 2 and FIG. 3, it should be noted that a plurality of first reflective devices 130 are disposed on second side walls 112b of the through holes 112. In the embodiment, the first reflective devices 130 may be stuck on the second side walls 112b of the through holes 112. The first reflective device 130 may have two first reflective surfaces 132 opposite to each other, wherein one of the first reflective surfaces 132 may face to the first side wall 112a, and the other of the first reflective surfaces 132 may face to the second side wall 112b and contact with the second side wall 112b. In the embodiment, a part of the light beam L emitted by the light emitting device 120 may be reflected to the first side walls 112a by the first reflective devices 130 and enters the light guide plate 110 so that the light use efficiency of light source module 100 of the embodiment may increase. In the embodiment, the first reflective devices 130 may be a white reflector, a silver reflector or other suitable reflective devices.

Figure 7:
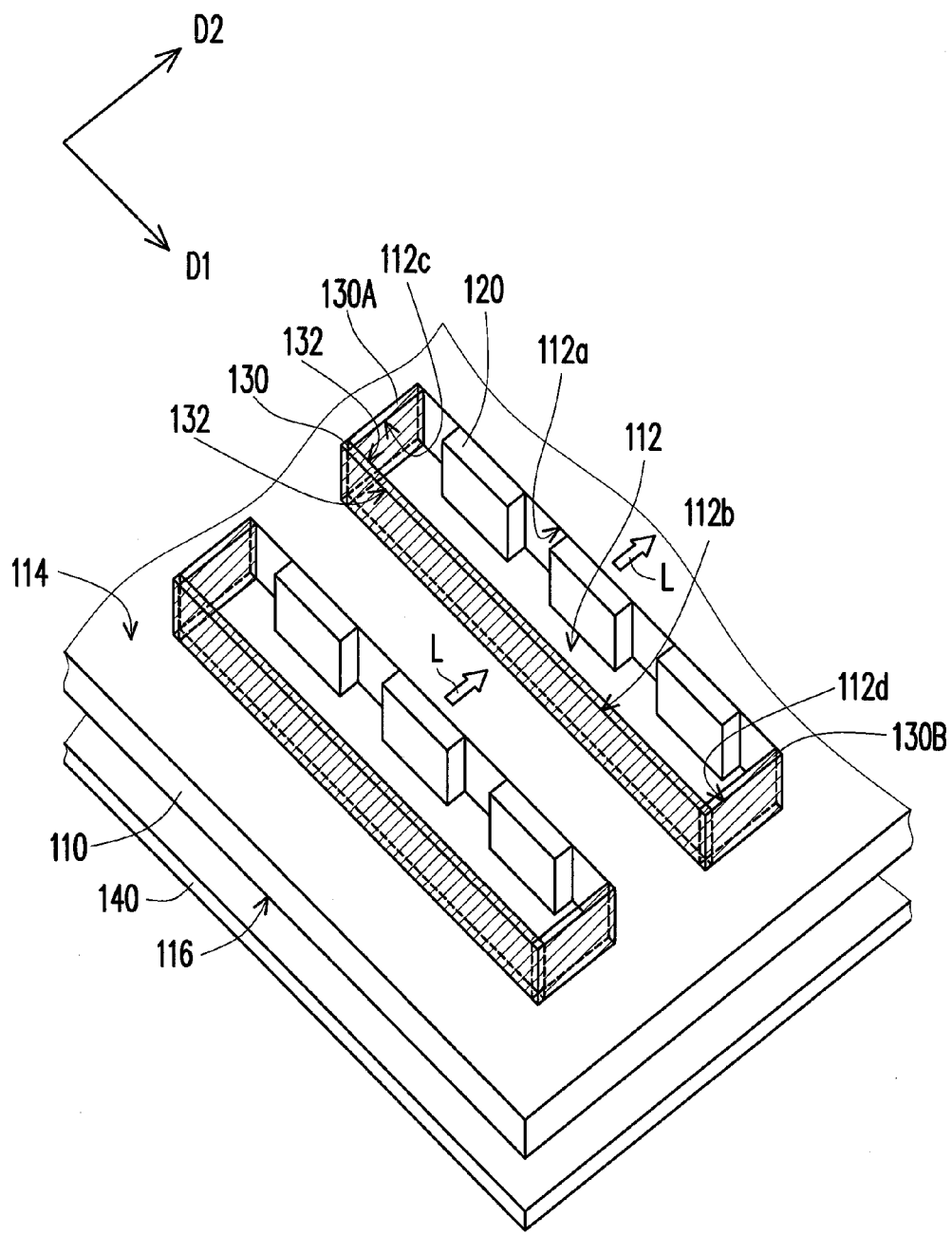
FIG. 7 illustrates a light source module in partial sectional view according to another embodiment of the invention.
Figure 8:
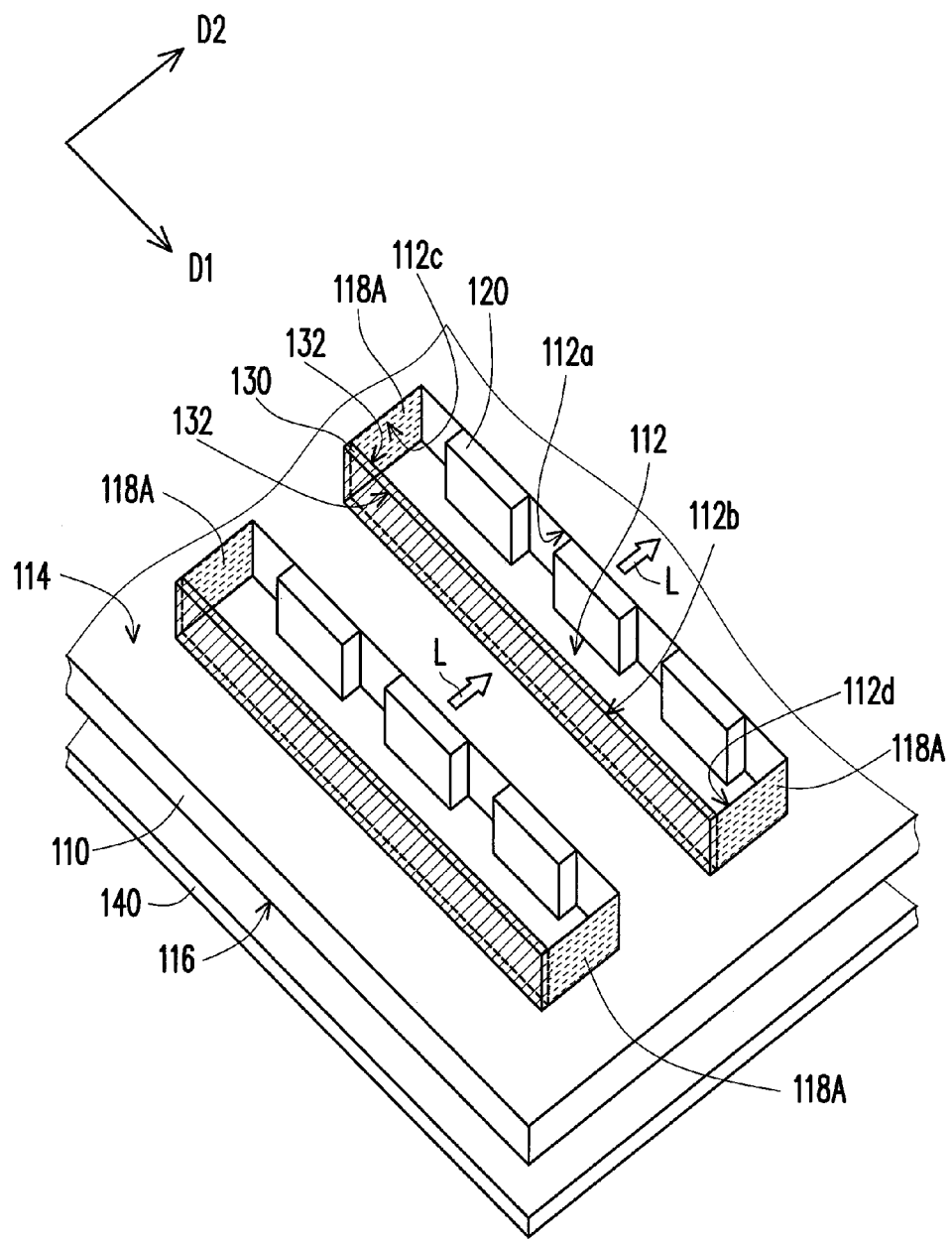
FIG. 8 illustrates a light source module in partial sectional view according to another embodiment of the invention.

However, the invention is not limited to the above paragraphs, in other embodiment, reflective devices and optical micro structures may be selectively disposed on other side walls of the through holes 122. That will be illustrated by FIG. 7 and FIG. 8 in following paragraphs. FIG. 7 illustrates a light source module in partial sectional view according to another embodiment of the invention. FIG. 8 illustrates a light source module in partial sectional view according to another embodiment of the invention. The light source module shown in FIG. 7 and FIG. 8 and the light source module 100 shown in FIG. 1 and FIG. 2 are similar so the same devices are denoted by the same symbols. Referring to FIG. 7, each of the through holes 112 further has a third side wall 112c and a fourth side wall 112d opposite to the third side wall 112c, wherein the third side wall 112c is connected to the first side wall 112a and the second side wall 112b, and the fourth side wall 112d is connected to the first side wall 112a and the second side wall 112b. In this embodiment, a second reflective device 130A and a third reflective device 130B may be respectively disposed on the third side wall 112c and the fourth side wall 112d. Referring to FIG. 8, in this embodiment, a plurality of optical micro structures 118A may be disposed on the third side wall 112c and the fourth side wall 112d.

Referring to FIG. 3, the light guide plate 110 of the embodiment further has a plurality of optical micro structures 118. In the embodiment, the optical micro structures 118 may be disposed on the light emitting surface 114. However, the invention is not limited thereto, and in other embodiments, the optical micro structures 118 may be also disposed on the first surface 116. The light beam L emitted by the light emitting device 120 (as shown in FIG. 2) may leave the light guide plate 110 by the optical micro structures 118. The optical micro structures 118 of the embodiment may be net points formed by printing or injecting, concave micro structures respect to the light emitting surface 114, micro structures protruding from the light emitting surface 114 or a combination thereof.

Referring to FIG. 1, FIG. 2 and FIG. 3 again, the light source module 100 of the embodiment may further include a second reflective device 140. The first surface 116 may be disposed between the second reflective device 140 and the light emitting surface 114. The light beam L leaving the light guide plate 110 from the first surface 116 may be transmitted into the light guide plate 110 again by the second reflective device 140, so that the light use efficiency of the light source module 100 of the embodiment may be increased. In the embodiment, the second reflective device 140 may be a white reflector, a silver reflector or other suitable reflective devices.

As shown in FIG. 3, the light source module 100 of the embodiment may further include a plurality of driving circuit boards 150. The driving circuit boards 150 are electrically connected to the light emitting devices 120 and are able to drive the light emitting devices 120. In the embodiment, the second reflective device 140 may be disposed between the driving circuit board 150 and the first surface 116 of the light guide plate 110. The light source module 100 of the embodiment may further include a back plate 160. The back plate 160 is able to carry the devices disposed above thereto, for example, the driving circuit board 150, the second reflective device 140, the light emitting device 120, the light guide plate 110, the first reflective device 130, etc. Moreover, the light source module 100 of the embodiment may further include at least one optical film 170. The light emitting surface 114 may be disposed between the optical film 170 and the first surface 116. The optical film 170 improves the optical performance of the light source module 100 of the embodiment.

The Second Embodiment

Figure 9:
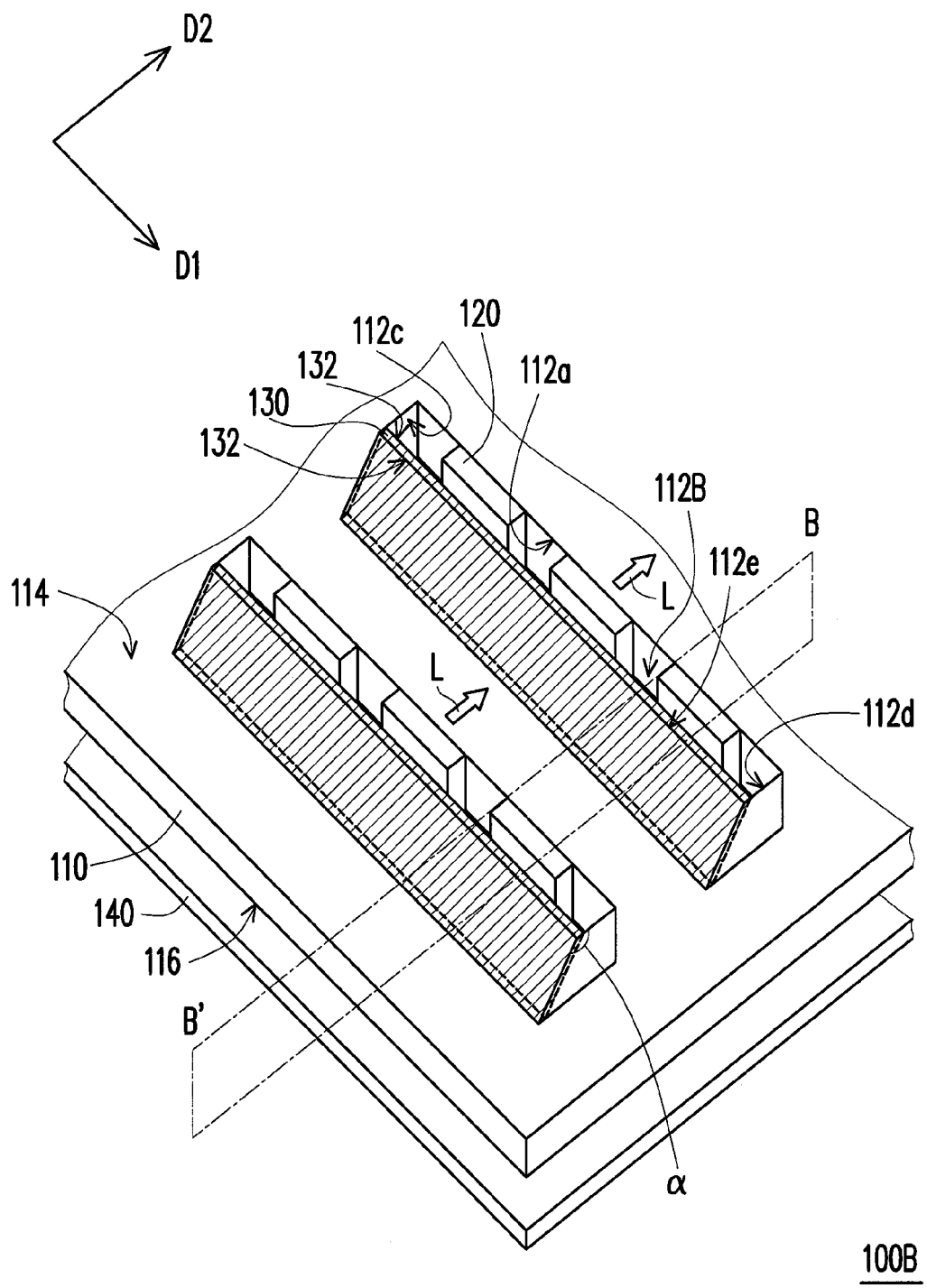
FIG. 9 is a diagram of a light source module in partial sectional view according to the second embodiment of the invention.
Figure 10:
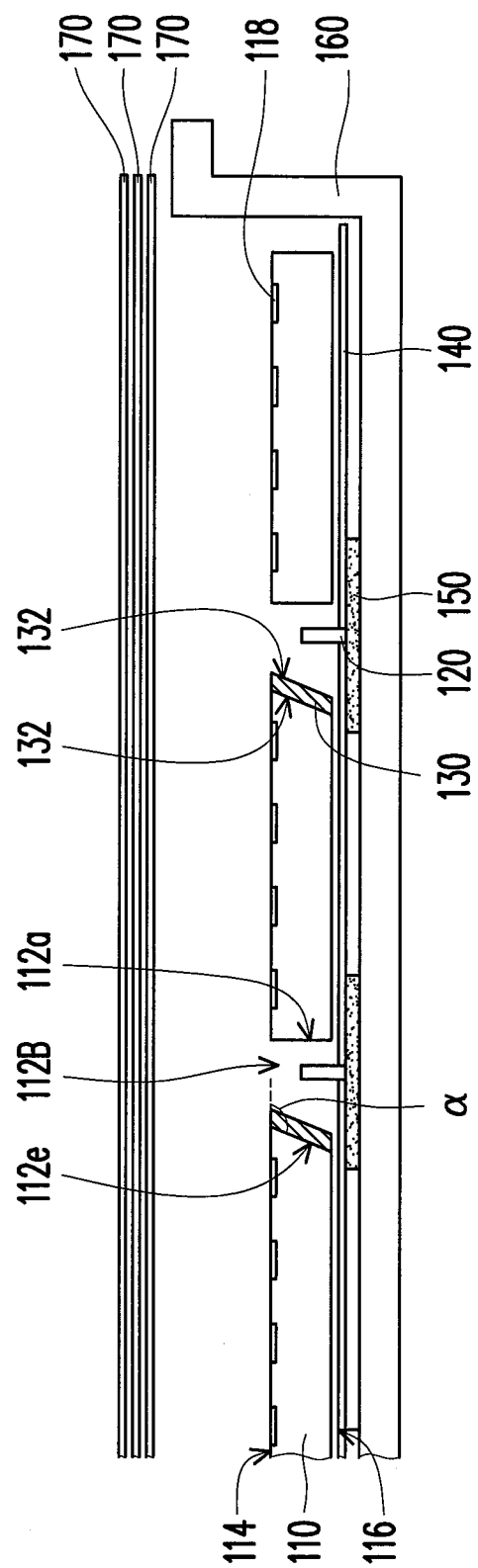
FIG. 10 illustrates a cross section corresponding the surface BB' shown in FIG. 9.

FIG. 9 is a diagram of a light source module in partial sectional view according to the second embodiment of the invention. FIG. 10 illustrates a cross section corresponding the surface BB' shown in FIG. 9. It should be noted that FIG. 9 neglects a back plate, a driving circuit board electrically connected to light emitting devices, optical films, and optical micro structure for representing obviously. Moreover, the normal vector of the surface BB' and the first direction D1 are parallel. Referring to FIG. 9 and FIG. 10, the light source module 100B of the embodiment and the light source module 100 of the first embodiment are similar so the same devices are denoted by the same symbols. The difference of the light source module 100B from the light source module 100 rests on the shape of the through holes 112B of the light source module 100B being different from the shape of the through holes 112 of the light source module 100. The difference is explained as the following, but the same portion is omitted to describe.

The through holes 112B of the embodiment pass through the light emitting surface 114 of the light guide plate 110 and the first surface 116. The through hole 112B has a first side wall 112a and a second side wall 112e opposite to the first side wall 112a. The first side wall 112a and the light emitting surface 114 may be substantially perpendicular to each other, and the second side wall 112e may be inclined to the light emitting surface 114. In detail, there is an obtuse included angle α between the second side wall 112e and the light emitting surface 114, and the second side wall 112e is inclined toward the first side wall 112a. In other words, the outline of the through hole 112B cutting by a reference surface (as the paper surface of FIG. 10) perpendicular to the light emitting surface 114 may be a trapezoid with a right angle. The upper edge of the trapezoid may be located in the light emitting surface 114, and the bottom edge of the trapezoid may be located in the first surface 116. Moreover, the light source module 100B has functions and advantages similar to the light source module 100, which is omitted to describe.

The Third Embodiment

Figure 11:
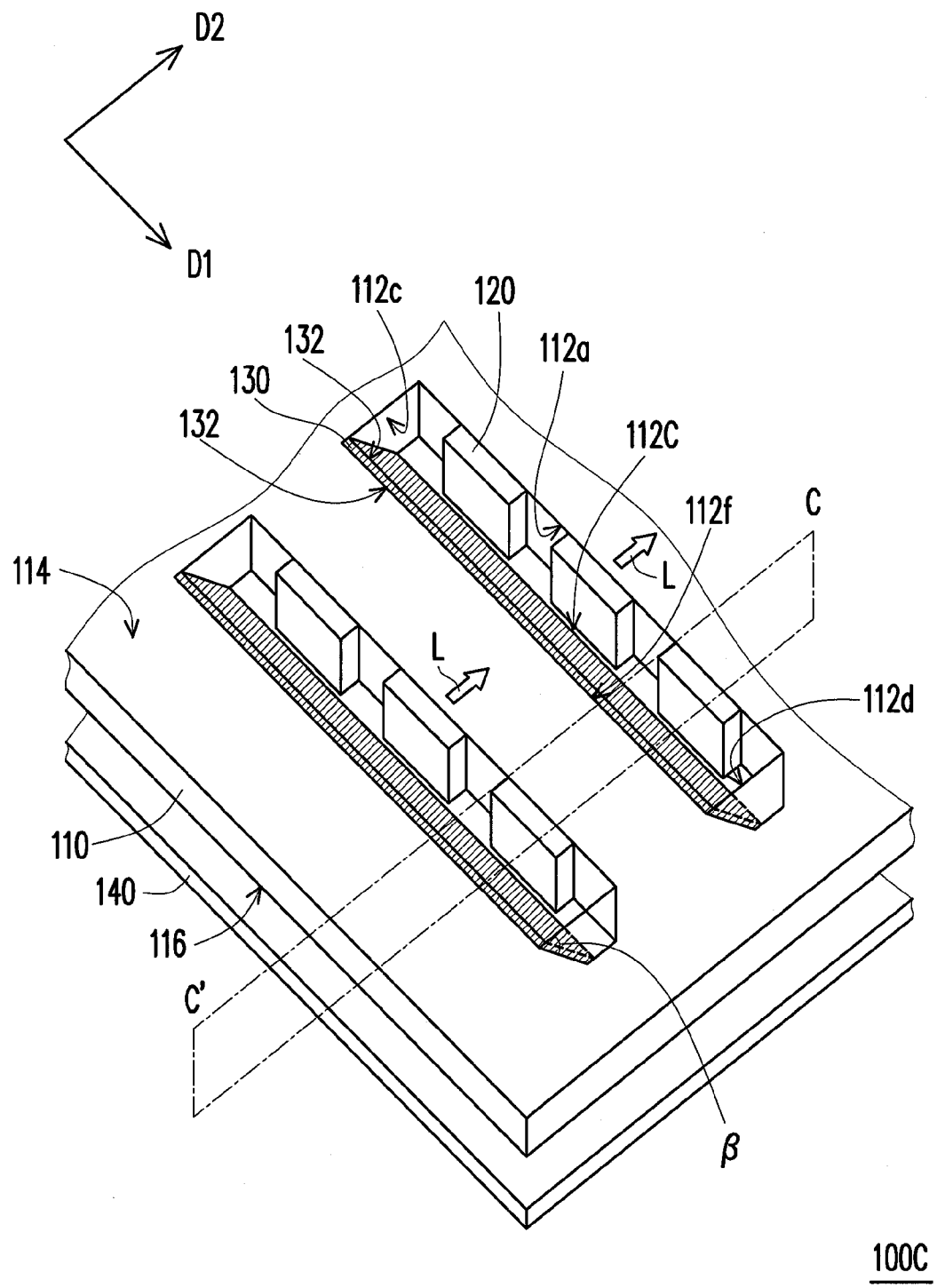
FIG. 11 is a three dimensional diagram of a light source module in partial sectional view according to the third embodiment of the invention.
Figure 12:
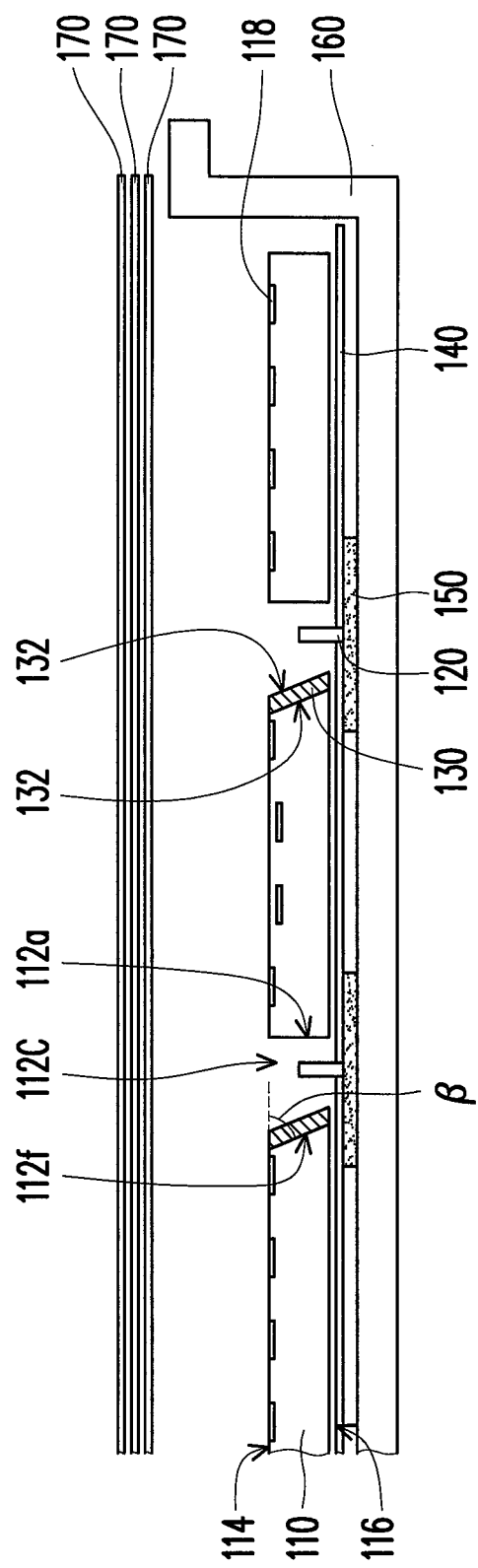
FIG. 12 illustrates a cross section corresponding the surface CC' shown in FIG. 11.

FIG. 11 is a three dimensional diagram of a light source module in partial sectional view according to the third embodiment of the invention. FIG. 12 illustrates a cross section corresponding the surface CC' shown in FIG. 11. It should be noted that FIG. 11 also neglects a back plate, a driving circuit board electrically connected to light emitting devices, optical films, and optical micro structure for representing obviously. Moreover, the normal vector of the surface CC' and the direction D1 are parallel. Referring to FIG. 11 and FIG. 12, the light source module 100C of the embodiment and the light source module 100 of the first embodiment are similar so the same devices are denoted by the same symbols. The difference of the light source module 100C from the light source module 100 rests on the shape of the through holes 112C of the light source module 100C being different from the shape of the through holes 112 of the light source module 100. The difference is explained as the following, but the same portion is omitted to describe.

The through holes 112C of the embodiment pass through the light emitting surface 114 of the light guide plate 110 and the first surface 116. The through hole 112C has a first side wall 112a and a second side wall 112f opposite to the first side wall 112a. The first side wall 112a and the light emitting surface 114 may be substantially perpendicular, and the second side wall 112f may incline to the light emitting surface 114. In detail, as shown in FIG. 12, there is an acute included angle β between the second side wall 112f and the light emitting surface 114, and the second side wall 112f may incline along a direction far away the first side wall 112a. In other words, the outline of the through hole 112C cutting by a reference surface (as the paper surface of FIG. 12) perpendicular to the light emitting surface 114 may be a trapezoid with a right angle. The upper edge of the trapezoid may be located in the first surface 116, and the bottom edge of the trapezoid may be located in the light emitting surface 114. The length of the upper edge along a direction perpendicular to the normal vector of the light emitting surface 114 may be shorter than the length of the bottom edge along the direction perpendicular to the normal vector of the light emitting surface 114. Moreover, the light source module 100C has functions and advantages similar to the light source module 100, which is omitted to describe.

The Fourth Embodiment

Figure 13:
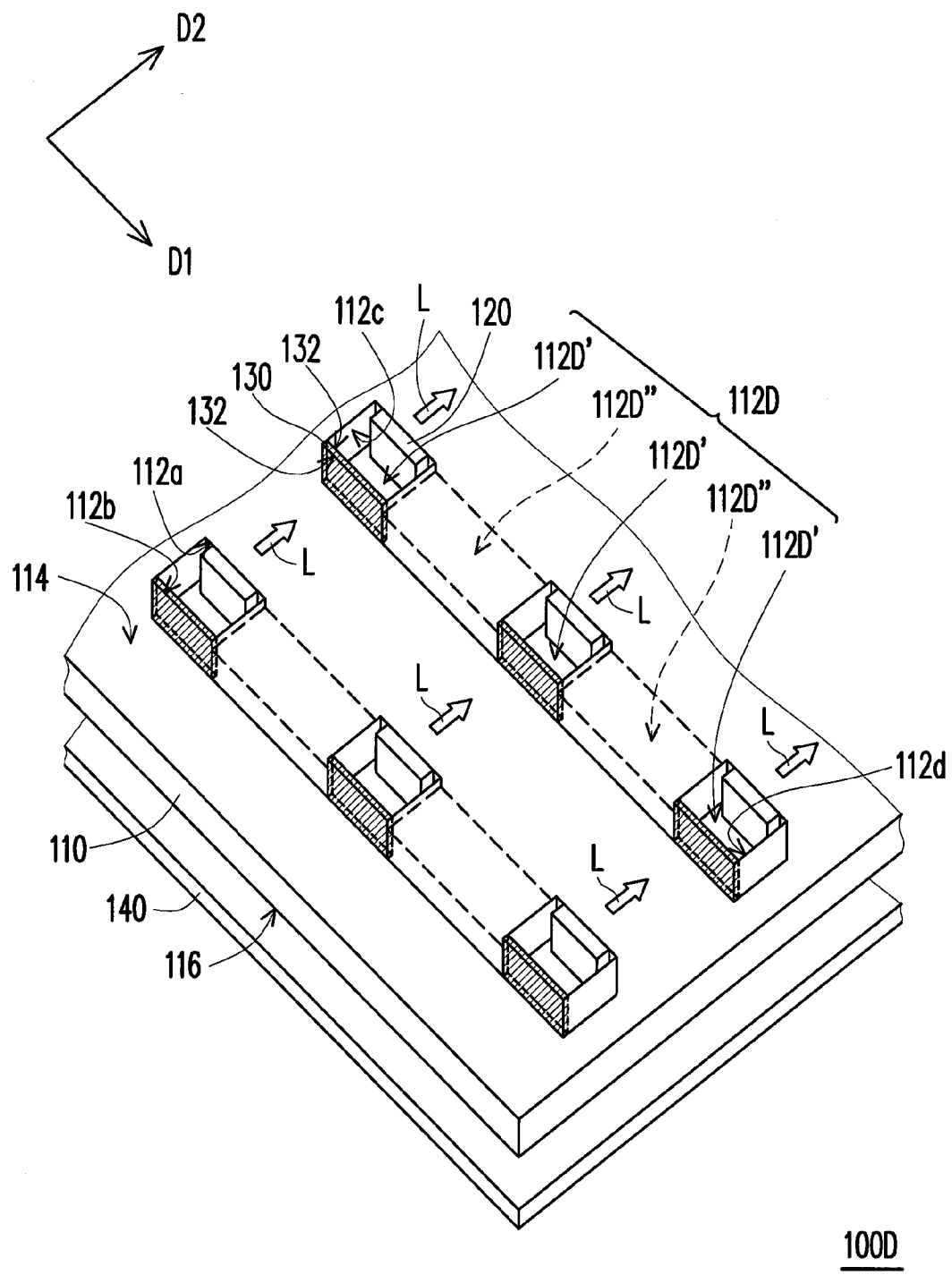
FIG. 13 is a three dimensional diagram of a light source module in partial sectional view according to the fourth embodiment of the invention.

FIG. 13 is a diagram of a light source module in partial sectional view according to the fourth embodiment of the invention. It should be noted that FIG. 13 neglects a back plate, a driving circuit board electrically connected to light emitting devices, optical films, and optical micro structure for representing obviously. Referring to FIG. 13, the light source module 100D of the embodiment and the light source module 100 of the first embodiment are similar so the same devices are denoted by the same symbols. The difference of the light source module 100D from the light source module 100 rests on the shape of the through holes 112D of the light source module 100D being different from the shape of the through holes 112 of the light source module 100. The difference is explained as the following, but the same portion is omitted to describe.

The through holes 112D of the embodiment has at least one penetrating part 112D' and at least one concaving part 112D''' connected to the penetrating part 112D'. The penetrating part 112D' penetrates the light emitting surface 114 and the first surface 116. The concaving part 112D' penetrates the first surface 116 and doesn't penetrate the light emitting surface 114. The light emitting device 120 is fully disposed in the penetrating part 112D'. Moreover, the light source module 100D has functions and advantages similar to the light source module 100, which is omitted to describe.

In summary, in a light source module of one embodiment of the invention, a plurality of light emitting devices are disposed in a plurality of through holes of the light guide plate and at least one of the light emitting devices is disposed in each of the through holes so that the heat generated by the light emitting devices is hardly gathered in one side of the light guide plate. Thereby, the problem about wrinkles being formed on optical films of a conventional side-type light source module due to the heat gathering in one side of the light guide plate may be solved.

Moreover, in a light source module of one embodiment of the invention, the light beam emitting by a plurality of light emitting devices may be transmitted into the light guide plate uniformly by the first side walls of the through holes due to a plurality of light emitting devices are disposed in the through holes of the light guide plate and at least one of the light emitting device is disposed in each of the through holes. Thereby, in the light source module of one embodiment of the invention, it need not have a long light-mixing distance between the light emitting devices and the light emitting surface of the light guide plate and thus it is easy to realize a thin design.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A light source module comprising:
a light guide plate, having a plurality of through holes and a light emitting surface, the through holes passing through the light emitting surface, and each of the through holes having a first side wall and a second side wall opposite the first side wall;
a plurality of light emitting devices, at least one of the light emitting devices disposed in each of the through holes, each of the light emitting devices capable of emitting a light beam, and the light beam enters the light guide plate from the first side wall of the through hole which the light emitting device disposed in and leaves the light guide plate from the light emitting surface; and
a plurality of first reflective devices, disposed on the second side walls of the through holes,
wherein each of the through holes is stripe-shaped, and at least two of the light emitting devices are disposed in each of the through holes.

2. The light source module as claimed in claim 1, wherein the first side wall and the light emitting surface are substantially perpendicular.

3. The light source module as claimed in claim 2, wherein the second side wall and the first side wall are substantially parallel.

4. The light source module as claimed in claim 2, wherein there is an obtuse included angle between the second side wall and the light emitting surface.

5. The light source module as claimed in claim 2, wherein there is an acute included angle between the second side wall and the light emitting surface.

6. The light source module as claimed in claim 1, wherein the through holes are aligned along a second direction and a first direction, and the second direction and the first direction are cross.

7. The light source module as claimed in claim 1, wherein the through holes are arranged in n columns, n is a natural number and larger than 2, the n columns of the through holes are arranged along a second direction, a reference plane is substantially perpendicular to the light emitting surface, orthogonal projections of the through holes arranged in the odd columns projected on the reference plane and orthogonal projections of the through holes arranged in the even columns projected on the reference plane are alternately arranged along a first direction, and the second direction and the first direction are cross.

8. The light source module as claimed in claim 1, wherein the first reflective device has two first reflective surfaces opposite to each other, one of the first reflective surfaces connects with the second side wall, and the other of the first reflective surfaces faces to the first side wall.

9. The light source module as claimed in claim 1, further comprising: a second reflective device, wherein the light guide plate further has a first surface opposite the light emitting surface, and the first surface is between the second reflective device and the light emitting surface.

10. A light source module comprising:
a light guide plate, having a plurality of through holes and a light emitting surface, the through holes passing through the light emitting surface, and each of the through holes having a first side wall and a second side wall opposite the first side wall;
a plurality of light emitting devices, at least one of the light emitting devices disposed in each of the through holes, each of the light emitting devices capable of emitting a light beam, and the light beam enters the light guide plate from the first side wall of the through hole which the light emitting device disposed in and leaves the light guide plate from the light emitting surface; and
a plurality of first reflective devices, disposed on the second side walls of the through holes,
wherein each of the through holes has at least one penetrating part and at least one concaving part connected to the penetrating part, the light guide plate further has a first surface opposite the light emitting surface, the penetrating part penetrates the light emitting surface and the first surface, the concaving part penetrates the first surface and extends toward the light emitting surface, and one of the light emitting devices is disposed in the penetrating part.

11. A light source module comprising:
a light guide plate, having a plurality of through holes and a light emitting surface, the through holes passing through the light emitting surface, and each of the through holes having a first side wall and a second side wall opposite the first side wall;
a plurality of light emitting devices, at least one of the light emitting devices disposed in each of the through holes, each of the light emitting devices capable of emitting a light beam, and the light beam enters the light guide plate from the first side wall of the through hole which the light emitting device disposed in and leaves the light guide plate from the light emitting surface; and
a plurality of first reflective devices, disposed on the second side walls of the through holes,
wherein each of the through holes further has a third side wall, the third side wall is connected to the first side wall and the second side wall, and the light source module further comprises at least one second reflective device disposed on the third side wall.

12. The light source module as claimed in claim 11, wherein each of the through holes further has a fourth side wall opposite the third side wall, the fourth side wall is connected to the first side wall and the second side wall, and the light source module further comprises at least one third reflective device disposed on the fourth side wall.

13. A light source module comprising:
a light guide plate, having a plurality of through holes and a light emitting surface, the through holes passing through the light emitting surface, and each of the through holes having a first side wall and a second side wall opposite the first side wall;
a plurality of light emitting devices, at least one of the light emitting devices disposed in each of the through holes, each of the light emitting devices capable of emitting a light beam, and the light beam enters the light guide plate from the first side wall of the through hole which the light emitting device disposed in and leaves the light guide plate from the light emitting surface; and
a plurality of first reflective devices, disposed on the second side walls of the through holes,
wherein each of the through holes further has a third side wall and a fourth side wall opposite the third side wall, the third side wall is connected to the first side wall and the second side wall, the fourth side wall is connect to the first side wall and the second side wall, and the light source module further comprises a plurality of optical micro structures disposed on the third side wall and the fourth side wall.

* * * * *